United States Patent [19]

Braswell

[11] Patent Number: 4,998,373

[45] Date of Patent: Mar. 12, 1991

[54] DOUBLE HOOK LURE

[76] Inventor: Odell W. Braswell, 405 S. Willow Ave., Cookeville, Tenn. 38501

[21] Appl. No.: 246,418

[22] Filed: Sep. 19, 1988

[51] Int. Cl.$^5$ ............................................. A01K 83/00
[52] U.S. Cl. ................................... 43/42.37; 43/43.16
[58] Field of Search ................. 43/42.37, 44.8, 44.4, 43/42.44, 43.16

[56] References Cited

U.S. PATENT DOCUMENTS

| | | |
|---|---|---|
| 471,548 | 3/1892 | Haviland . |
| 699,397 | 5/1902 | Lacey . |
| 831,552 | 9/1906 | Hallstrom . |
| 1,055,748 | 3/1913 | Howse . |
| 1,208,936 | 12/1916 | England . |
| 2,250,478 | 9/1939 | Franks ............................ 43/42.37 |
| 2,598,011 | 5/1952 | Pitre ............................... 43/44.8 |
| 2,621,438 | 12/1952 | Helin .............................. 43/42.44 |
| 2,700,242 | 1/1955 | Porth .............................. 43/44.4 |
| 3,855,722 | 12/1974 | Moore ............................ 43/42.37 |
| 3,861,073 | 1/1975 | Thomassin ...................... 43/42.37 |
| 4,738,047 | 4/1988 | Ryan .............................. 43/42.37 |

Primary Examiner—Kurt Rowan
Attorney, Agent, or Firm—Luedeka, Hodges & Neely

[57] ABSTRACT

A double hook lure includes a pair of shanks having piercing ends defined by sharp tips and their associated barbs, the shanks having first bends causing them to diverge from one another in a shank plane from a lead head in which their other ends are embedded, so that the piercing ends are laterally spaced apart. An eye is substantially, fixedly connected to the lead head for attachment of the lure to a fishing line so that the lure is retrieved through the water by the line in a travel direction. Bights in the shanks cause the piercing ends to point generally toward the lead head and along lines generally parallel to and spaced from the shank plane, and second bends in the shanks cause the tips to point along substantially parallel lines which are substantially parallel to the travel direction. In a preferred form, the eye is configured to project from the lead head so that the weight of the lead head together with the disposition of the eye biases the lure to an upright position with the piercing ends of the shanks above the shank plane during retrieval of the lure.

10 Claims, 1 Drawing Sheet

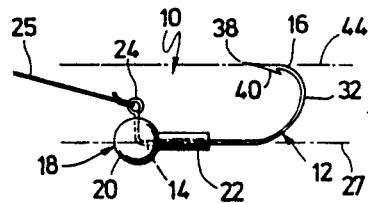
FIG.1A
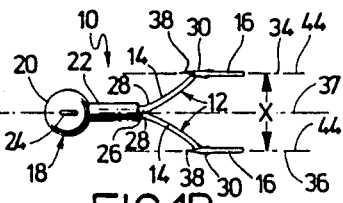
FIG.1B
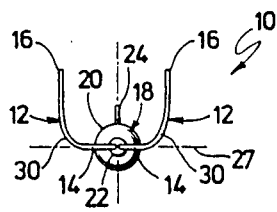
FIG.1C
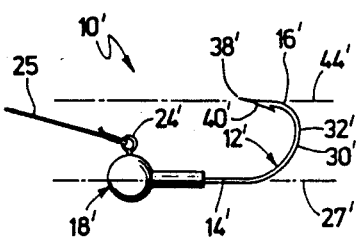
FIG.2A
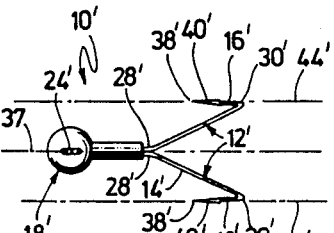
FIG.2B
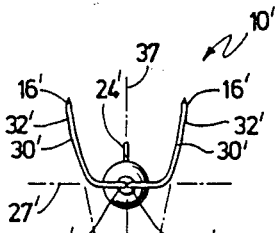
FIG.2C
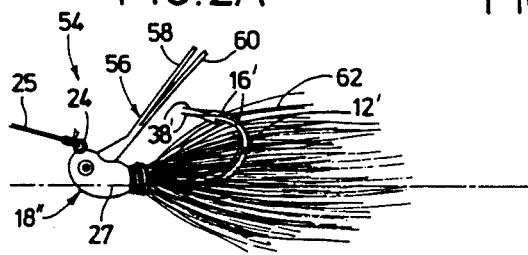
FIG.3A
FIG.3B
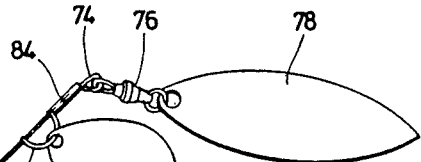
FIG.4
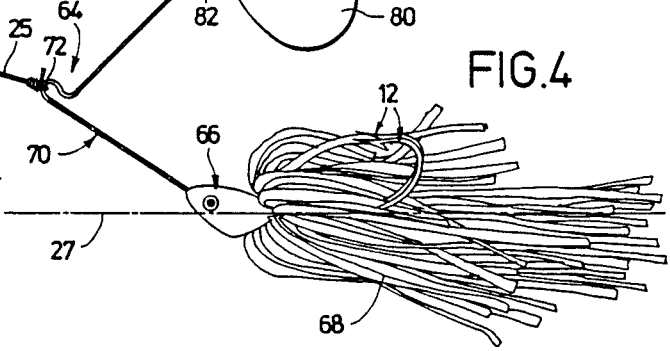
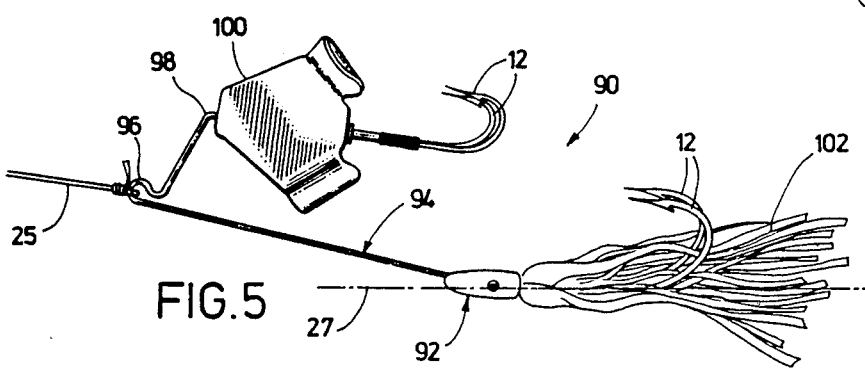
FIG.5

DOUBLE HOOK LURE

The present invention relates to artificial lures, plugs and the like, and more particularly relates to a double hook lure which is highly effective in hooking fish that strike the lure, and which maintains itself in an upright orientation to provide a weedless feature.

It is known to provide multiple hooks in artificial lures, plugs and the like (hereinafter "lures") with the general object being to increase the opportunity of hooking fish that strike the lures. Treble hooks are an example of this. Pairs of hooks have also been used by co-attaching the eyes of two hooks on a screw eye, and by sliding the eye of one hook over the barb of another hook so that it hangs from the bend of the other hook between its barb and eye. This is commonly called a trailer hook.

The above approaches to the mounting of individual or multiple fish hooks on artificial lures are disadvantageous in that the hooks can turn to overlapping positions, or to positions that are substantially unparallel to the direction of travel of the lure. In the case in which the hooks overlap, they are for all practical purposes only as effective as though a single hook were available and presented to the fish as it strikes the lure. In the second case, the unparallel hook suffers an increased chance of hanging on weeds, rocks or other lake bottom structures and is in an ineffective orientation for catching fish striking the lure. Lures having treble hooks are difficult to make weedless, and the treble hooks tend to become entangled with the line or other parts of the lure. Also, the treble hooks, as with the previously used double hooks, pivot in relation to the rest of the lure. A fish striking a line having a pivoting hook is often able to throw the hook by pivoting it with respect to the lure.

Accordingly, it is an object of the present invention to provide a double hook lure which avoids the disadvantages of known multiple hook lures.

Another object of the invention is the provision of a double hook lure which impales a striking fish with maximum penetrating force.

Yet another object of the invention is the provision of a double hook lure in which the piercing points are oriented along substantially parallel lines that are spaced apart and substantially parallel to the direction of movement of the lure through the water so that a fish striking the lure from behind is impaled substantially simultaneously with both piercing points and with maximum penetration force.

An additional object of the invention is the provision of a double hook lure which is self-righting to an orientation in which the piercing points of the hooks are in an upright position to minimize engagement of the piercing points with weeds, rocks or other lake-bottom structures, and to place the piercing points in an optimal orientation for penetrating a fish's mouth with minimum opportunity for the fish to throw the hooks.

Still another object of the invention is the provision of a double hook lure which is inexpensive in construction and is simple to manufacture.

The above and other objects and advantages of the present invention will become apparent to those of ordinary skill in the art as the same becomes known with reference to the following detailed description of preferred embodiments when considered in conjunction with the accompanying drawings in which:

FIGS. 1A through 1C are side elevational, top plan, and end elevational views of a double hook lures illustrating one embodiment of the invention;

FIGS. 2A through 2C are side elevational, top plan, and end elevational views, respectively, illustrating another embodiment of the invention;

FIGS. 3A and 3B are side elevational and top plan views, respectively, of a further embodiment of the invention;

FIG. 4 is a side elevational view illustrating yet another form of the lure of the invention; and FIG. 5 is a side elevational view illustrating still another embodiment of the invention.

Briefly, the double hook lure of the present invention comprises a pair of elongate shanks each having a base end and a piercing end with a sharp tip and an associated barb on the piercing end. Support means are provided for supporting the shanks in close proximity to one another adjacent their base ends and in such a manner as to restrict relative movement between the shanks.

Attachment means substantially fixedly connected to the support means are provided for attachment of the lure to a fishing line so that the lure is retrieved through the water in a travel direction under the influence of a force exerted on the line generally longitudinally thereof. The shanks are supported by the support means in fixed relation to the attachment means to restrict pivotal movement of the shanks with respect to the attachment means.

A first bend is formed in each shank adjacent the support means and is configured to cause the shanks to diverge from one another in a shank plane extending from adjacent the support means to dispose the piercing ends in laterally spaced apart relation. A bight is formed in each shank adjacent the piercing end in spaced relation to the first bend, each of the bights having a curvature of about 180° so that the tips of the piercing ends point in directions generally toward the support means along piercing lines that are generally parallel to and spaced from the shank plane.

A second bend is formed in each shank and is configured to dispose the tips of the piercing ends so that the piercing lines are substantially parallel to one another and to the travel direction.

The invention is advantageous over known multiple hook lures because the piercing lines of the tips are substantially parallel to one another and to the travel direction of the lure, which has been discovered to be an optimal configuration for hooking fish that strike the lure, particularly those fish striking from behind.

In a preferred embodiment, means are provided for weighting the lure and are configured together with the attachment means to bias the lure to an upright position in which the bights and the tips of the piercing ends are generally above the shank plane during retrieval of the lure. In accordance with this feature of the invention, engagement of the sharp tips with weeds, rocks, and other lake-bottom structure is minimized. Also, the upright position of the lure is an advantageous orientation for hooking fish that strike the lure.

Referring now to the drawings in which like reference characters designate like or corresponding parts throughout the several views, embodiments of a double hook lure specifically adapted for artificial lures, casting plugs and the like (hereinafter "lures") are shown in FIGS. 1 through 5 illustrating features of the present invention.

With initial reference to FIGS. 1A through 1C, a lure 10 in the nature of an artificial lure typically known as a lead-head jig includes a pair of substantially identically configured shanks each being generally designated by the reference character 12. Each shank has a base end 14 and a piercing end 16, the former extending into the confining structure of a lead head 18.

The lead head 18 comprises an enlarged portion 20 and an extension 22, and may be decorated by painting and the like in order to attract fish. Preferably, the head 18 has a weight of from about 1/16 ounce to about 1 ounce depending primarily on the size of the hook. For example, with the shanks 12 corresponding in size to a No. 4 or 6 hook the head 18 preferably has a weight of about 1/16 ounce. With the shanks 12 correspnding in size to a No. 5/0 to 6/0 hook, the head 18 preferably has a weight of about 1 ounce.

In the illustrated embodiment, the shanks 12 are confined along a portion of their length adjacent their base end 14 in the extension 22 to restrict relative movement between the shanks so that they are substantially immovable with respect to one another. Preferably, the base end 14 of at least one of the shanks extends completely through the lead head 18 as shown in FIG. 1A and terminates in an eye 24, by which the lure 10 is attached to a fishing line 25. (Shown only in FIG. 1A for clarity.) The manner in which the shanks 12 are supported in the head 18 fixes the shanks relative to the eye 24 so that pivotal movement of the shanks 12 in relation to the eye is prevented. The base ends 14 of the shanks 12 are closely adjacent one another, preferably in contacting side-by-sirde relation, adjacent the head 18.

The eye 24 is, of course, outside the lead head 18 and is preferably disposed at a right angle to the base ends 14 of the shanks 12. The disposition of the line 25 attached to the eye 24 indicates generally the direction of travel of the lure 10 as it is retrieved through the water under the influence of a force exerted longitudinally of the line.

First bends 26 in the shanks 12 are located adjacent the base ends 14 and the head 18, and dispose the shanks in diverging relation along a portion of their length extending from the lead head 18 in a shank plane 27 that is generally perpendicular to the orientation of the eye 24. By virtue of the first bends 26, the piercing ends 16 are disposed in spaced apart relation.

In the embodiment of FIGS. 1A through 1C, second bends 30 in each shank 12 dispose the remainder of the length of the shanks, defined by bights 32, in spaced apart substantially parallel planes 34 and 36. The bights 32 are substantially equally spaced from a vertical plane 37 bisecting the lure 10 along its length. Preferably, the planes 34 and 36 of the bights 32 are disposed at substantially the same angle with respect to the eye 24, which in this embodiment is about 0°.

The bights 32 extend between the second bends 30 and the piercing ends 16, which are defined by conventional sharp tips 38 and their associated barbs 40. The curvature of the bights 32 is preferably about 180° so that the tips 38 point generally towards the base ends 14 as shown in FIGS. 1A and 1B.

The tips 38 and their associated barbs 40 extend along a portion of the length of the piercing ends 16 of the shanks 12, and have directions lines 44 (one being shown in FIG. 1A) that correspond to the direction in which the tips point. The lines 44 are spaced vertically by the bights 32 from the plane 27 containing the portion of the shanks 12 extending between the first and second bends 28 and 30, are preferably substantially parallel to the plane 27, and in this embodiment lie substantially in the planes 34 and 36 of the bights 32. The lines 44 are thus disposed substantially parallel to one another by virtue of the second bends 30 and generally parallel to the direction of movement of the lure 10 as it is retrieved.

The shanks 12 may correspond generally in size to known hook sizes in a conventional range of from a No. 4 or No. 6 hook up to and including a No. 5/0 or No. 6/0 hook. A distance X between lines 44 in preferably about 1/16 in. for shanks 12 corresponding in size to a No. 4 or No. 6 hook and is preferably about 1 in. for shanks 12 corresponding in size to a No. 5/0 or No. 6/0 hook.

The weight of the head 18, together with the disposition of the eye 34, serves to bias the lure 10 to an upright position with the piercing ends 16 of the shanks 12 disposed above the plane 27 generally as shown in FIG. 1C during retrieval of the lure.

Another form of the double hook lure 10' is shown in FIGS. 2A through 2C. The lure 10' is substantially identical to that of the lure 10 of FIGS. 1A through 1C except that second bends 30' in shanks 12' are formed in the bights 32', whereas the second bends 30 of FIGS. 1A through 1C are formed just ahead of bights 32 in the shank 12 on the opposite end of the bights 32 from the piercing ends 16.

In the lure 10', the second bends 30' are configured like the bends 30 to dispose the tips 38' so that the direction lines 44' are substantially parallel. With the second bends 30' located in the bights 32', the latter assume a slightly twisted configuration when viewed from the end as in FIG. 2C. Planes 50 and 52 in which the bights 32' generally lie diverge slightly in an upward direction from the plane 27 of the shanks 12 as the shanks diverge from the first bends 28'.

Like the lure 10 of FIGS. 1A through 1C, the lead head 18' and eye 24' serve to maintain the lure 10' in the aforementioned upright position during retrieval. (The line 25 is omitted from FIGS. 2B through 2C for clarity).

FIGS. 3A and 3B illustrate a lure 54 in accordance with the invention and in the nature of a lead-head jig including a pair of shanks 12' configured as shown in FIGS. 2A through 2C with a lead head 18" that is identical in function to that of the head 18' but with a slightly different shape. The disposition of the eye 24' is the same in the lure 54 of FIGS. 2A through 2C as in the lure 10' of FIGS. 2A through 2B. However, lure 54 includes a weed guard 56 attached to the top side of the head 18". The weed guard 56 is splayed into two parts 58 and 60 and extends to a point generally vertically above the tips 38', as shown in FIG. 3A, and is inclined rearwardly to reduce drag.

As shown in FIG. 3B, the guard 56 is disposed approximately midway between the piercing ends 16 when the lure 54 is viewed from the top. The guard 54 functions to minimize engagement of the sharp tips 38' of the shanks 12' with weeds, sticks or other structure in the path of the lure 54 as it moves through the water. The lure 54 also includes a skirt 62 which is tied to the head 18" adjacent the first bends 28. The skirt functions to hide the shanks 12' and to attract fish in a known manner.

FIG. 4 illustrates a lure 64 in accordance with the invention and in the nature of a spinner bait-type lure having shanks 12 configured as illustrated and described above with reference to FIGS. 1A through 1C. The base ends 14 of the shanks 12 are embedded in a lead head 66 corresponding to lead head 18 and shaped and decorated to attract fish. A skirt 68 is attached to the rear portion of the head 66 to hide the shanks 12 and to impart a lifelike appearance to the lure 64.

A relatively stiff, resiliently flexible wire 70 extends from the front of the head 66 in a disposition that is forwardly inclined with respect to the plane 27. The wire 70 is bent over upon itself to form an eye 72 at a position spaced from the head 66 for attachment of a fishing line to the lure 64. From the eye 72, the wire 70 extends up in a rearward direction and terminates in a second eye 74 located above the head 66. The entire length of the wire 70 preferably lies substantially in the plane 37 (See FIG. 1B) which extends vertically between the shanks 12. Also, the portion of the wire extending between eyes 72 and 74 is preferably straight and is disposed generally perpendicular to the portion extending between the eye 72 and the head 66, which is also preferably straight.

A swivel 76 is attached to the second eye 74 and supports a trailing elongate spinner 78 for rotation about its longitudinal axis behind the eye 74 in a conventional fashion. A blade 80 is supported on the portion of the wire 70 between the eyes 72 and 74 using an eye member 82 which is spaced from eye 74 by a spacer 84. The blade 80 serves to stabilize the lure 64 as it is moved through the water.

The head 66 preferably has a weight of about ⅛ ounce for shanks 12 corresponding in size to a No. 1/0 or No. 2/0 hook and a weight of about 1 ounce for shanks 12 corresponding in size to a No. 4/0 or No. 5/0 hook, and together with the configuration of the wire 70, serve to maintain the lure 64 in a substantially upright orientation generally as shown in FIG. 4 during retrieval of the lure.

A lure 90 in accordance with the invention and in the nature of a spinner bait-type lure is shown in FIG. 5 and includes a pair of shanks 12 configured as shown in FIGS. 1A through 1C like the lure 64 of FIG. 4. The lure 90 includes a head 92 corresponding to the head 66 of the lure 64.

In the lure 90, a relatively stiff, resiliently flexible wire 94 extends forwardly from the head 92 at a slight incline with respect to plane 27. The wire 94 is bent over upon itself to form an eye 96 at a position spaced from the head 92. The portion of the wire 94 between the eye 96 and the head 92 is preferably straight.

From the eye 96, the wire 94 extends upwardly to a bend 98 generally perpendicular to the portion between the eye 96 and head 92. The wire 94 then extends back towards the head 92 in a disposition that is generally parallel to the portion of the wire extending between the eye 96 and head 92. The wire 94 supports a second pair of identically configured shanks 12 on its end by suitable means to restrict relative movement between the shanks and, the wire, such as by soldering or the like. The shanks 12 supported on the wire 94 are preferably in substantially the same disposition with regard to the travel direction as the shanks 12 extending from the head 92, but are smaller. For example, the second pair of shanks 12 may correspond in size to a No. 1/0 hook and the shanks 12 extending from the head 92 may correspond in size to a No. 5/0 hook.

A spinner 100 is supported on the portion of the wire 94 extending between the bend 98 and the second pair of shanks 12 for rotation about the longitudinal axis of this portion of the wire. The spinner is preferably a buzz bait blade used to displace water on the surface, therefore attracting fish to both sound and flash.

The entire length of the wire 94 is preferably disposed substantially in the plane 37 that extends vertically between the shanks 12 as shown in FIG. 1B. The lure 90 also contains a trailing skirt 102 to hide the shanks 12 and provide a lifelike appearance to the lure.

The weight of the head 92 preferably varies according to the hook size to which the shanks 12 correspond, like the head 66 of the lure 64 of FIG. 4. And, the weight of the head 66, together with the above-described configuration and dispostion of the wire 94, serves to maintain the lure 90 in a substantially upright disposition as shown in FIG. 5 during retrieval of the lure 90.

Lures constructed in accordance with the present invention are advantageous over artificial lures of the prior art employing multiple hooks. A particular advantage involves the substantially parallel disposition of the lines corresponding to the directions in which the tips point in the various embodiments. Since these lines are substantially parallel and are also substantially parallel to the direction of movement of the lure, maximum penetrating force is achieved, and the tips make essentially simultaneous contact with the fish's mouth when the lure is struck from behind. Thus, the fish is less able to throw the lure. Fish are also less able to throw the lure of the present invention because, unlike known multiple hook artificial lures, the shanks are fixed in a manner which restricts pivotal movement of the shanks with respect to the eye or attachment means. This takes away the leverage advantage previously made available to the fish due to the pivoting of the hooks. Similar advantages are achieved in accordance with the feature of the invention involving the maintenance of the lure in the above-described upright position which is highly effective in landing fish striking the lure. The upright orientation also provides a weedless feature. The lure of the present invention is also simple to make requiring no more than the standard manufacturing techniques and materials so that a relatively inexpensive artificial lure is produced which is highly effective for its intended purpose.

It is to be understood that the forms of the invention illustrated herein are to be considered as preferred embodiments of the same and that changes in the shape and arrangement of the parts, modifications and substitutions may be resorted to without departing from the scope and spirit of the claims.

What is claimed is:

1. A double hook lure comprising:
a pair of elongate shanks each having a base end and a piercing end with a sharp tip and an associated barb on the piercing end;
support means for supporting said shanks in close proximity to one another adjacent their base ends and in such a manner as to restrict relative movement between said shanks;
attachment means substantially fixedly connected to said support means for attachment of the lure to a fishing line so that the lure is retrieved through the water in a travel direction under the influence of a force exerted on the line generally longitudinally thereof, said shanks being supported by said support means in substantially fixed relation to said attachment means to restrict pivotal movement of the shanks with respect to the attachment means;

a first bend formed in each shank adjacent said support means and configured to cause said shanks to diverge from one another in a shank plane extending from adjacent said support means to dispose said piercing ends in spaced apart relation;

a bight formed in each shank adjacent said piercing end in spaced relation to said first bend, each of said bights having a curvature of about 180° so that said tips of said piercing ends points in directions toward said support means substantially along piercing lines that are parallel to and spaced from said shank plane; and a second bend formed in each shank and configured to dispose said tips of said piercing ends so that the piercing lines are substantially parallel to one another and to the travel direction.

2. The lure of claim 1, further comprising weight means for weighting the lure and configured together with said attachment means to bias the lure to an upright position in which said bights and said tips of said piercing ends are generally above said shank plane during retrieval of the lure.

3. The lure of claim 2, wherein said weight means and support means comprise a lead weight embedding said shanks adjacent their base ends and said attachment means comprises an eye connected to said weight and disposed generally perpendicular to the shank plane and on the same side thereof as said tips of said piercing ends.

4. The lure of claim 1, wherein said support means comprises a lead weight embedding said shanks adjacent their base ends and said attachment means comprises an eye connected to said weight and disposed generally perpendicular to the shank plane and on the same side thereof as said tips of said piercing ends.

5. The lure of claim 1, wherein said second bends are formed adjacent the ends of said bights that are adjacent said first bends.

6. The lure of claim 1, wherein said second bends are formed in said bights.

7. The lure of claim 1, wherein said piercing ends are laterally spaced apart from about one-sixteenth inch to about one inch.

8. The lure of claim 1, wherein said support means comprise a weight embedding said shanks adjacent their base ends and the attachment means comprises a relatively stiff, resiliently flexible wire extending from said weight and being bent over upon itself at a location spaced from said weight to provide an eye for attachment of a fishing line to the lure, a portion of said wire between said weight and said eye being generally straight and projecting in a direction that is forwardly inclined with respect to the shank plane and substantially parallel to said piercing lines, said wire further comprising an extension having a terminal end and projecting from said eye in a direction that is generally perpendicular to the portion of said wire between said weight and said eye, and supporting a spinner adjacent its terminal end for rotation about an axis that is generally parallel to the travel direction.

9. The lure of claim 8, wherein said extension further supports a double hook comprising:

a second pair of elongate shanks each having a base and a piercing end with a sharp tip and an associated barb on the piercing end;

support means for supporting said second shanks on said extension in fixed relation thereto and in close proximity to one another adjacent their base ends in such a manner as to restrict relative movement between said second shanks;

a first bend formed in each of said second shanks adjacent said support means and configured to cause said second shanks to diverge from one another in a second shank plane extending from said bends to dispose said piercing ends in spaced apart relation;

a bight formed in each of said second shanks adjacent said piercing ends in spaced relation to said first bends, each of said bights having a curvature of about 180° so that said tips of said piercing ends point in directions generally toward said support means along second piercing lines that are generally parallel to and spaced from said second shank plane;

a second bend formed in each of said second shanks and configured to dispose said tips of said piercing ends so that said piercing lines are substantially parallel to one another and to the travel direction; and said second shank plane and second piercing lines being generally parallel to said shank plane and piercing lines of said shanks that are embedded in said weight adjacent their base ends.

10. A double hook lure comprising:

a pair of elongate shanks each having a base end and a piercing end the latter of which has a sharp tip and an associated barb;

a lead weight embedding said shanks adjacent their base ends in side-by-side contact with the remaining length of said shanks toward said piercing ends projecting out of said weight;

first bends formed in said shanks adjacent to and outside of said weight and spaced from said piercing ends to cause said shanks to diverge from one another in a shank plane as they extend from said weight so that said piercing ends are laterally spaced from one another;

a bight formed in each shank adjacent its piercing end and having a curvature of about 180° to dispose said tips of said piercing ends so they point substantially along piercing lines that are disposed in a direction toward said weight and parallel to and spaced from said shank plane;

an eye extending from said weight for attachment of a fishing line to the lure so that the lure is retrieved through the water in a travel direction under the influence of a force exerted on the line generally longitudinally thereof, said eye projecting from said weight generally perpendicular to said shank plane and on the same side thereof as said tips of said piercing ends of said shanks; and second bends formed in said shanks and configured to dispose said tips of said piercing ends so that said piercing lines are substantially parallel to one another and to the travel direction.

* * * * *

UNITED STATES PATENT AND TRADEMARK OFFICE
CERTIFICATE OF CORRECTION

PATENT NO. : 4,998,373

DATED : March 12, 1991

INVENTOR(S) : Odell W. Braswell

It is certified that error appears in the above-identified patent and that said Letters Patent is hereby corrected as shown below:

Column 2, line 2, "lures" should be -- lure --.

Column 3, line 15, "correspnding" should be -- corresponding --.

Column 3, line 32, "side-by-sirde" should be -- side-by-side --.

Column 4, line 12, "in" should be -- is --.

Column 4, line 18, "34" should be -- 24 --.

Signed and Sealed this

Twenty-eighth Day of July, 1992

Attest:

DOUGLAS B. COMER

*Attesting Officer*     *Acting Commissioner of Patents and Trademarks*